ELDON J. STRANDINE
CHARLES W. PECKENPAUGH
INVENTORS.

BY
ATTORNEY.

ELDON J. STRANDINE
CHARLES W. PECKENPAUGH
INVENTORS.

BY ET McCabe
ATTORNEY.

3,556,809
METHOD FOR INJECTING A LIQUID ADDITIVE INTO POULTRY FLESH

Eldon J. Strandine, Chicago, Ill., and Charles W. Peckenpaugh, Detroit Lakes, Minn., assingors to Swift & Company, Chicago, Ill., a corporation of Delaware
Original application Apr. 1, 1968, Ser. No. 717,803, now Patent No. 3,511,164, dated May 12, 1970. Divided and this application Nov. 19, 1969, Ser. No. 871,325
Int. Cl. A22c *21/00*
U.S. Cl. 99—107          3 Claims

ABSTRACT OF THE DISCLOSURE

Poultry carcasses are treated to improve the eating qualities, notably flavor, tenderness, juiciness, and fat content, by injecting an additive, such as a vegetable oil emulsion, into the meat tissue of the breast areas by inserting a hollow needle into the flesh from locations exposed at either of the posterior and anterior visceral incisions. In this way the needle can be inserted along a path that is generally normal to the tissue fiber structure so as to release the additive in directions aligned with and between the fibers. Also the injection can be made without penetrating the skin of the fowl whereby there will be substantially less opportunity for the additive to ooze from the tissue.

---

This application is a division of our co-pending application Ser. No. 717,803, filed Apr. 1, 1968, now Pat. No. 3,511,164 issued May 12, 1970.

This invention relates to method and apparatus for improving the eating qualities of poultry; and more specifically relates to a method and apparatus for injecting a treating agent or additive, such as an edible fat or oil, into poultry flesh.

The prior art teaches the injection of various additives into poultry flesh as being beneficial. For example, the Tichy Pat. No. 2,418,914 teaches various materials, including butter, to be beneficial when injected into meat or poultry by high-pressure spray that passes the material into the flesh apparently without breaking the skin. Earlier the Mareta Pat. No. 2,128,952 taught that seasoning materials could be injected through a hollow needle inserted through the skin into the flesh of poultry. More recently, the Nelson Pat. No. 3,035,508 has taught a multiple needle injecting device for introducing liquid formulas at various points on a poultry carcass; and the Schwall et al. Pat. No. 3,366,491 has taught that fat may be injected into poultry in such a way as to purposely exude therefrom during cooking.

With the exception of the Tichy patent, the prior art has involved techniques that result in openings in the poultry skin through which an additive is introduced and through which the additive may subsequently escape. Tichy, however, introduces such materials apparently without breaking the skin, but does so only in localized areas and with a relatively expensive piece of equipment. However, it is believed to be of significant advantage to be able to introduce an additive throughout a relatively large portion of poultry flesh in a manner whereby the additive will be substantially wholly retained therein. Retention of the additive is primarily beneficial to eating qualities, but also improves the appearance of poultry intended for the consumer market, as compared to the prior art, by avoiding a greasy surface condition which is particularly unattractive when the carcass is packaged in transparent film.

Accordingly, it is a principal objective of the present invention to provide an improved method and apparatus for introducing an additive to poultry flesh whereby the additive will be retained therein and prevented from escape.

It is another object of the present invention to provide an improved method and apparatus for introducing an additive such as a fat or oil to the white meat or breast area of poultry in a more even and uniform distribution without puncturing or breaking the poultry skin.

It is still another object of the present invention to provide an improved method and apparatus for injecting an additive into the Pectoralis superficialis muscle of a poultry carcass.

It is yet another object of the present invention to provide an improved method and apparatus for injecting an additive into the breast area of a poultry carcass in an economical and efficient manner.

Generally, the present invention comprises the positioning of an eviscerated fowl before an operator who then manually displaces the severed skin at either the anterior (crop) or posterior (ventral) visceral incisions, so as to expose the flesh of the Pectoralis superficialis muscle, and then penetrating the flesh in a generally horizontal and longitudinal direction with a relatively long hollow needle. The process is continued by pushing the needle through the flesh through almost the entire length of the breast area and then, while in place, injecting an additive through a plurality of spaced orifices along the needle body. Thereafter the needle is withdrawn and the displaced skin released to return to normal position covering the entry site. The invention can also be applied, with advantage, to the breast portions of poultry after removal from a carcass.

An apparatus devised for performance of the foregoing method comprises a relatively long, hollow needle having a closed pointed end and a plurality of spaced orifices located laterally along the body of the needle. Preferably a guide member is also spaced outwardly from the needle and is congruent therewith so as to regulate the depth of the needle in the flesh by sliding along the skin of the fowl.

Further objects and advantages will become apparent upon reading the following detailed specification in conjunction with the drawings where:

The present invention is mainly directed to the injection of an additive material into the flesh of a poultry carcass. Preferably the additive is intended to moisturize and tenderize the drier portions of poultry flesh. To that end, it is preferred to use an emulsion of vegetable oil, particularly of coconut oil, that will congeal rapidly when injected into a chilled carcass. It is the nature of cooked white meat of poultry to be of a dry texture. Poultry dark meat is relatively moist, when cooked, as compared to the white meat, and benefits relatively little from the addition of such an ingredient. The white flesh of turkey benefits to the greatest extent from the injection of an additive such as a moisturizing agent, particularly the Pectoralis superficialis which becomes even dryer during cooking. The Pectoralis profundus, which underlies the superficialis muscle, is benefitted to a lesser extent as it also is normally juicier and is ofter referred to as the "tenderloin" of poultry. Accordingly, the greatest benefit of the present invention is obtained when it is practiced on the breast meat of turkeys; although advantage is also obtained where practiced on other fowl.

Figure 1:
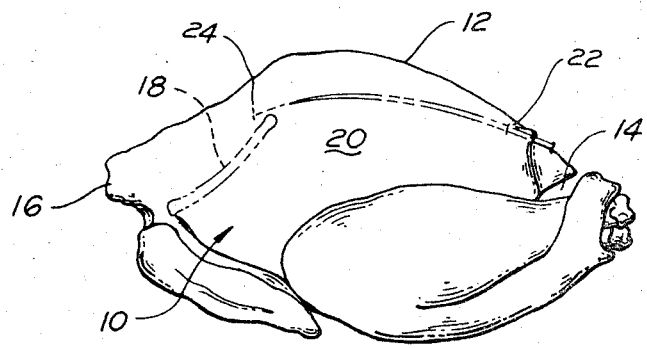
FIG. 1 is a profile view of a poultry carcass showing a preferred line of penetration in phantom.

With reference to the application of the invention to turkeys, it is to be noted in FIG. 1 that a turkey carcass generally 10 when rested upon its back disposes the breast areas upwardly and exposes the very distinct keelbone 12 ridge structure. In processing turkeys and other fowl, the carcass is usually eviscerated immediately after slaughter by making an incision in the ventral or posterior area of the bird where bone structure is absent. This is normally in a direct line with the keelbone 12. In FIG. 1 the posterior area is identified by reference character 14.

Similarly, certain of the evisceration steps are performed on the forward or anterior portion of the carcass and a similar incision is normally found in the crop area 16 of the bird.

Other notable conformation features of a poultry carcass are the wishbone 18 (shown in phantom in FIG. 1) and the breast tissue that overlays each side of the bird from approximately the wishbone rearwardly and directly beside the keelbone 12. The large body and major exterior portion of breast tissue is known as the Pectoralis superficialis muscle 20. A smaller muscle known as the Pectoralis profundus is located beneath the Pectoralis superficialis in a small area lying against the lower portion of the keelbone (the Pectoralis profundus is not shown in the drawings). The tissue fibers of the breast meat, and particularly of the Pectoralis superficialis 20, run generally from the keelbone 12 downwardly toward each wing of the bird.

We have found that the poultry tissue is more receptive to an additive material if the additive can be directed, for the most part, between the tissue fibers. Thus we have devised a means by which an additive such as an edible fat or oil can be injected in a multitude of small streams directed parallel to the tissue fibers. To accomplish this, one or more entry or injection channels are made generally longitudinally (with respect to the orientation of the carcass) in the breast tissue of each side of a carcass. While as many as four such channels may be conveniently made, satisfactory results have been achieved with a single channel in each breast. Also, it is preferred to create the channel without penetrating the skin of the carcass so that escape of the injected material through the channel will be retarded by the overlying, intact skin.

Accordingly, the carcass, after evisceration, is first placed on its back and the skin displaced outwardly from either the anterior or posterior evisceral openings. We prefer to use the posterior opening area because at the time of injection the bird should be at least partially chilled and prior to that time the giblets, neck, etc., will have been bagged and placed within the crop or anterior opening. Even after the legs of the bird have been trussed, access may be had to the posterior opening. However, because of the conformation of the flesh of fowls, the posterior area presents a smaller target. The anterior or crop area presents a rather thick area of breast tissue and would be the better choice for penetration if the present invention were to be practiced earlier in the processing of the fowl.

The longitudinal channel is made by inserting a hollow needle substantially lengthwise of the breast tissue. Where a single channel is to be made in each breast area, it is preferable to keep it entirely within the Pectoralis superficialis muscle 20. If the channel should penetrate the area between the Pectoralis superficialis and Pectoralis profundus muscles, there will be a tendency for the injected additive to collect at the interface of those muscles and not be distributed uniformly. Where multiple channels are selected, one or more can be directed specifically to each of the Pectoralis superficialis and Pectoralis profundus muscles.

Thus, a hollow needle having a plurality of lateral openings is inserted substantially through the length of the Pectoralis superficialis muscle. Because the muscle becomes quite shallow at the posterior end of the bird an entry site 22 is preferably located about 1 to 2 inches forward of the rearmost portion of the keelbone 12 and about ½ to 2 inches below the outer edge thereof. The needle is inserted at this point and aimed to run toward the wishbone 18 at a depth varying from ½ to 1 inch below the skin. Penetration is terminated about ½ inch short of the wishbone 18.

The hollow needle includes a plurality of orifices at opposite lateral sides thereof so that when in place an additive can be forced from the orifices outwardly in the general direction of the upper edge of the keelbone 12 and the lower portion (or back side) of the carcass. Because the breast tissue is substantially thicker at the forward area of the carcass adjacent the wishbone, and thinner at the rear portion, the orifices in the needle should be more closely spaced and/or of relatively larger diameter in the areas that will be inserted to the forward end of the bird; and relatively broadly spaced and/or smaller in diameter in the rear areas. Also, where the needle is to be inserted from the posterior end of the bird it preferably will have no orifices along that portion of the needle that will extend approximately 1 inch forward of the entry point 22 into the flesh. Otherwise there will be a tendency for any additive injected within this area of minimum flesh to be immediately expelled through the channel made by the needle.

The additive material is injected while the needle is held in place. Usually from 3% to 6% by weight of the carcass of an additive may be injected. The maximum amount is normally controlled by government regulation. We have found that approximately 3% by weight of an oil emulsion comprising approximately 84% coconut oil, 12% water, 3% salt, and the remainder of emulsifiers, flavor and coloring agents, produce very desirable improvements in the cooked flesh.

After the injection of liquid is complete, the needle is withdrawn smoothly so as not to enlarge the opening at the entry point 22 and the skin of the bird is then released to return to its normal position. The skin will thus cover the entry site and further hinder any tendency for the injected material to ooze therefrom. The above described emulsion is of further advantage in this regard as it sets up very sharply and thus will not ooze from the injection site.

Figure 2:
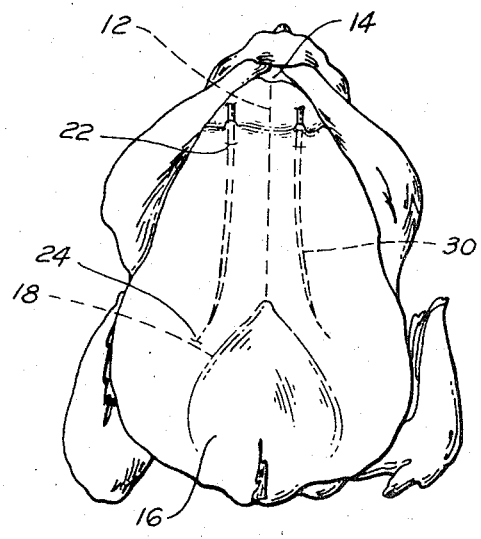
FIG. 2 is a top view of a poultry carcass showing the lines of penetration.

If it is elected to inject the breast tissue from the anterior end of the bird, it is merely necessary to similarly displace the skin of the crop opening and insert a needle generally centrally of the exposed flesh. Again, the needle should be directed substantially horizontally of the bird, while resting upon its back, from an entry point 24 near the breastbone to a point just short of a point that would be selected for posterior injection and without penetrating the flesh surface and skin. However, when it is intended to inject the bird from the anterior end, it is preferred to employ a needle whereon the orifices are arranged generally opposite from that of the previously described needle. That is, the orifices are more widely spaced or of smaller diameter near the pointed end (which will reach the shallow area of the Pectoralis superficialis muscle) and more closely spaced or of larger diameter at the opposite portion of the needle (which will reside in the thicker portion of the flesh near the wishbone 18). The additive is then injected and the needle withdrawn.

Where injecting from either the posterior or anterior end of the carcass, it will be seen that the preferred entry channel or path of insertion is substantially along a horizontal line (when the carcass is resting upon its back) extending between about the breastbone and a point ½ to 2 inches below and forward of the rearmost portion of the keelbone 12. The preferred line of penetration is shown in phantom on FIGS. 1 and 2.

Figure 3:
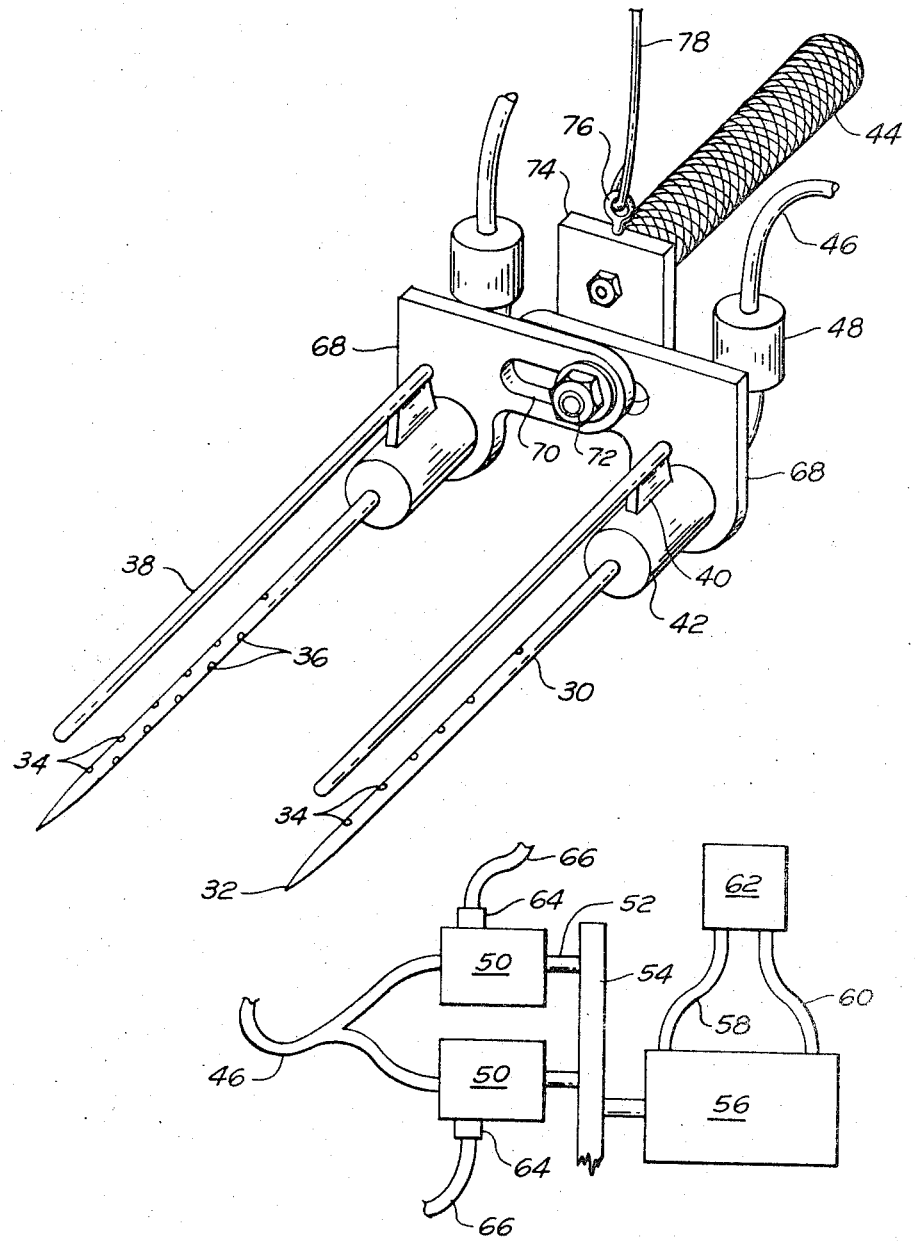
FIG. 3 is a perspective view of a preferred apparatus of the present invention.

A preferred apparatus for performing the foregoing method is shown in FIG. 3. The illustrated apparatus has two similar portions specifically devised for injection of both breasts of a turkey from the posterior incision. Each portion comprises a relatively long, hollow needle 30 having a closed pointed end 32 and a plurality of spaced lateral orifices 34 arranged in two courses along two opposite sides of the needle. An additional course of orifices 36 may be located along an area of the needle between the two lateral courses of orifices 34. Where an additional course of orifices 36 is employed, the orifices 36 preferably are staggered from orifices 34. Normally the needle 30 should be positioned so that when inserted into the poultry flesh the lateral orifices 34 will be generally aimed parallel to the tissue fibers, and the additional course of orifices 36 will be aimed inwardly of the carcass.

Preferably a guide member 38 is arranged parallel with the needle 30 and held spaced therefrom by a lug 40 mounted upon a barrel fitting 42 to which the needle is assembled. The guide 38 may be slightly shorter than the needle and is spaced therefrom a distance equal to the maximum depth of penetration desired for the needle beneath the poultry skin. It is also possible, although not necessary, that the needle may be slightly curved so as to approximate the contour of the breast tissue of a carcass. If the needle 30 is curved, the guide 38 should be similarly curved so as to be congruent with the needle; and the additional course of orifices 36 should be located in the concave surface area. Preferably the needle is manufactured of a slightly flexible stainless steel and will thus curve somewhat as it is inserted through the flesh. Furthermore it is possible to cause the needles to diverge slightly as they are advanced through the flesh so that as the points reach the anterior portions they will spread into the lower and thicker parts of the breast tissue.

A handle 44 is usually secured to the barrel 42 for convenience of an operator to manipulate the needle 30. A flexible hose 46 is connected to the needle 30 behind the barrel 42 and runs to a source of pressurized additive. Preferably a one-way check valve 48 is located between the barrel 42 and hose 46.

The source of additive may conveniently be a metering pump of a type well known in the art. However, a highly desirable source, which constitutes a separate invention, includes a plurality of metering cylinders 50, one or more of which are connected to a needle 30 by the hose 46. Each metering cylinder has an associated piston (not shown) that is driven by a piston rod 52 in turn connected by a yoke 54 to a power cylinder 56. The latter is controllable with regard to length of stroke and thereby controls the amount of material expelled from each metering cylinder 50. Air lines 58, 60 are connected to the forward and rear ends of the power cylinder 56 and to a control means 62 by which pressurized air is appropriately directed to control the stroke of yoke 54 in accordance with a pre-established setting or in accordance with a signal representing the weight of the fowl being treated. Suitable check valves 64 and conduits 66 connect each metering cylinder 50 to a supply of additive (not shown) so as to automatically refill the cylinder 50 when the piston therein is moved rearwardly.

The preferred form of apparatus as shown in FIG. 3 includes two of the above described needle assemblies ganged to a single handle for simultaneous insertion in both breast areas of a single carcass. This is preferably done by mounting each barrel 42 upon one end of separate L-shaped mounting brackets 68 which have elongated slots 70 at the opposite ends. Two such brackets are fastened together by a nut and bolt 72 run through each of the slots 70. A suspension bracket 74 is also connected by the same bolt 72 to the mounting brackets 68; and the handle 44 is secured to the former. Also an eyelet 76 at the top of the suspension bracket 74 conveniently receives a counter-weighted suspension wire 78 to support most of the weight of the apparatus. The slotted mounting brackets 68 allow for adjustment of the distance between needles 30 so as to conform the apparatus to the body shape of different types and weight ranges of birds. The brackets 68 may also be available in varying sizes to provide even wider adjustments in the size of the apparatus; and similarly the needles should be available in varying lengths.

As an illustration, we have found that most sizes of turkeys can be processed with needles $5/32$ inch outside diameter and small, medium or large lengths being $4\ 3/16$ inches, $5\ 3/16$ inches, and $6\ 11/16$ inches, respectively, plus a pointed tip of $1/4$ inch. We prefer to equally space plural orifices at $1/2$ inch centers commencing $3/8$ inch to the rear of the point for the lateral orifices and $5/8$ inch for the offset orifices. Where the needles are to be inserted from the posterior of a bird a first number of .045 inch diameter orifices are located nearer the point and a second number of .031 inch diameter orifices are located rearwardly thereof, all on $1/2$ inch centers. In addition a pair of small lateral orifices (in opposite sides of the needle) are spaced 1 inch further toward the shank of the needle. The total number of orifices recommended are as follows:

|  | Needle length | | |
| --- | --- | --- | --- |
|  | Small | Medium | Large |
| Large orifices in each lateral course | 2 | 3 | 4 |
| (Total) | (4) | (6) | (8) |
| Large orifices in single offset course | 2 | 3 | 4 |
| Small orifices in each lateral course | 2 | 3 | 5 |
| (Total) | (4) | (6) | (10) |
| Small orifices in single offset course | 1 | 2 | 3 |
| Terminal orifice in each lateral course | 1 | 1 | 1 |

The following examples illustrate the benefits of the inventions.

EXAMPLE I

Turkey breasts were removed from carcasses and separated into three test lots. An emulsion comprising 84% coconut oil, 12% water, 3% salt, and 1% emulsifier, flavoring and color was prepared. Each breast of a first lot was injected with an amount of emulsion equaling 9% of the breast weight by inserting a single needle, having multiple orifices, into the Pectoralis superficialis muscle without penetrating the skin and generally normal to the tissue fibers. The second and third lots of breasts were injected by multiple needles inserted through the skin and injecting amounts of emulsion equaling 7% and 9%, respectively, of each breast weight. All of the breasts were roasted under identical conditions at 325° F. oven temperature for 3 hours 25 minutes to an internal temperature of 175° F. The breasts of lot 1, injected according to this invention, displayed a cooking shrink (weight loss) of only 20.7% from the injected weight, whereas the breasts of lots 2 and 3, injected by needles inserted through the skin were found to have a weight loss of 21.2% and 26.7%, respectively.

Examination for taste and tenderness showed a marketed preference for the breasts injected at the higher percentage levels with some superiority noted for the breasts of lot 1. Testers recognized benefit over untreated turkey breasts meat and found the cooked flesh of each injected breast to be uniformly affected throughout.

These data demonstrate that a relatively larger proportion of the emulsion injected according to the present invention (lot 1) is retained in the tissue throughout cooking than where injected through the skin; and at higher, preferred levels of injection, breasts injected in accordance with the invention have a significantly lower cooking shrink.

EXAMPLE II

A whole turkey weighing approximately 11 lbs. was injected with 3% by weight of the emulsion described in Example I. The emulsion was divided into two equal parts and injected by fractions into each breast by inserting a hollow-multiple orifice needle through the Pectoralis superficials muscles from the posterior incision toward the wishbone. The needle was inserted twice in one breast and three times in the other breast. Thereafter the turkey was cooked (without stuffing) in a 325° F. oven for 4 hours 30 minutes and to internal breast and thigh temperatures of 175° and 184° F., respectively. Cooking shrink was found to be 25.5%. Examination by eating showed no noticeable difference between meat taken from the two breasts, both being pleasing and jelly and judged superior to the flesh of untreated turkey.

Obviously many modifications and variations of the invention as hereinbefore set forth may be made without departing from the spirit and scope thereof, and, therefore, only such limitations should be imposed as are indicated in the appended claims.

We claim:

1. An improved method for injecting a liquid additive into the flesh of an eviscerated fowl having anterior and posterior incisions to improve the eating qualities of the flesh thereof, said method comprising: exposing both the left and right breast tissues at one of said incisions; penetrating the exposed flesh of each breast by inserting a hollow needle in a direction generally longitudinal of the fowl carcass and substantially parallel to the keelbone whereby the iquid additive when injected will be expelled from a plurality of orifices exposed along the sides of said needle in direction substantially parallel to the fibers of said tissue; injecting a quantity of liquid additive into the breast tissue by expelling same from said needle and distributing relatively greater quantities of said liquid additive in the thicker portions of said tissue adjacent the crop area of the fowl; withdrawing the needle from the flesh of the fowl; and covering the entry site made in the flesh of each breast by the needle with unperforated skin so as to hinder the injected material from oozing therefrom.

2. The method of claim 1 wherein the fowl is first at least partially chilled.

3. The method of claim 2 wherein the legs of the fowl have been trussed and the flesh of the fowl is penetrated from the posterior thereof.

References Cited

UNITED STATES PATENTS 3,366,491  1/1968  Schwall et al. _____ 99—107

HYMAN LORD, Primary Examiner